April 23, 1946.   S. GOLDMAN   2,399,017
LOCATING EQUIPMENT
Filed July 26, 1943

Inventor:
Stanford Goldman,
by Harry E. Dunham
His Attorney.

Patented Apr. 23, 1946

2,399,017

UNITED STATES PATENT OFFICE 2,399,017

LOCATING EQUIPMENT

Stanford Goldman, Fairfield, Conn., assignor to General Electric Company, a corporation of New York Application July 26, 1943, Serial No. 496,120

7 Claims. (Cl. 177—352)

The present invention relates to echo ranging and locating equipment in which echoes or reflections of wave energy are used to determine the positions of remote objects. By using directional transmitting and receiving antennas and knowing the time of transmission of the wave energy, the time of reception of the echo or reflection, and the direction from which the echo is received, the direction and range of the reflecting object can be determined.

In prior equipment the information has been obtained from directional pulses of wave energy from which echoes are received in accordance with the ranges of the reflecting objects. With this sort of equipment it is essentially necessary that a reply pulse be received, before a new direction can be investigated. This necessitated a relatively slow speed of directional scanning.

With the equipment of the present invention the scanning rate can be increased by transmitting energy in a continuous wave and utilizing the angle between the transmitting and receiving antennas in conjunction with the scanning rate to determine range. The position of the receiving antenna is used to determine direction. Because there can be effectively simultaneous investigation of more than one direction, the "field of vision" of the equipment is increased and it is easier to maintain contact with moving objects.

The object of my invention is to provide an improved type of locating equipment for increasing the rate of obtaining information.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Figs. 1a, 1b, and 1c are diagrams illustrating the operation of the equipment and Fig. 2 is a diagram of the equipment.

Figures 1A, 1B, 1C:
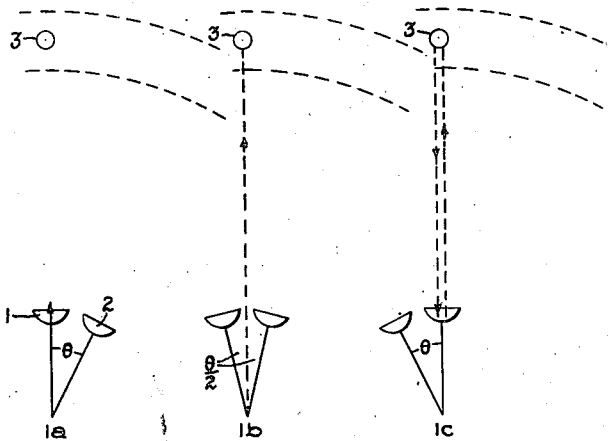

The operation of the equipment is illustrated in Figs. 1a, 1b, and 1c in which is represented a directional transmitter 1 which continuously radiates wave energy, a directional receiver 2, and a remote object 3. The transmitter and receiver are rotated at a constant angular velocity and the receiver lags the transmitter by the angle $\theta$. At the instant represented in Fig. 1a the transmitter is pointed directly at the remote object and wave energy is starting to leave the transmitter. When the transmitter and receiver are in the position represented in Fig. 1b, the wave energy has arrived at the remote object, and the line of sight to the remote object bisects the angle between the transmitter and the receiver. When the transmitter and receiver are in the position represented by Fig. 1c, the wave energy reflected by the remote object has arrived at the receiver and can be used to indicate the position of the remote object. At this instant the line of sight of the receiver passes through the object. From this description it is apparent that the angular displacement between the transmitter and the receiver, the angular velocity of rotation of the transmitter and the receiver, and the velocity of the wave energy determine the range of the remote object and that the direction of the receiver at the time of arrival of the reflection or echo determines the direction. If all of these quantities are fixed, the equipment will determine the range and direction of remote objects within an error determined by the directional characteristics of the transmitter and receiver. The range of the remote object can be expressed mathematically as the product of the velocity of travel of the wave energy by the angle between the transmitter and receiver divided by twice the angular velocity of the transmitter and receiver. The range being investigated by the equipment can be varied by varying the angle between the transmitter and receiver. When this is done, the receiver scans an annulus or zone between minimum and maximum ranges determined by the minimum and maximum angles of displacement between the transmitter and receiver. Because wave energy can be transmitted continuously, information as to the location of remote objects can be more rapidly obtained. This is particularly important in the case of supersonic locating equipment where the relatively low velocity of the wave energy has heretofore placed serious limitations on the speed with which information could be obtained.

Figure 2:
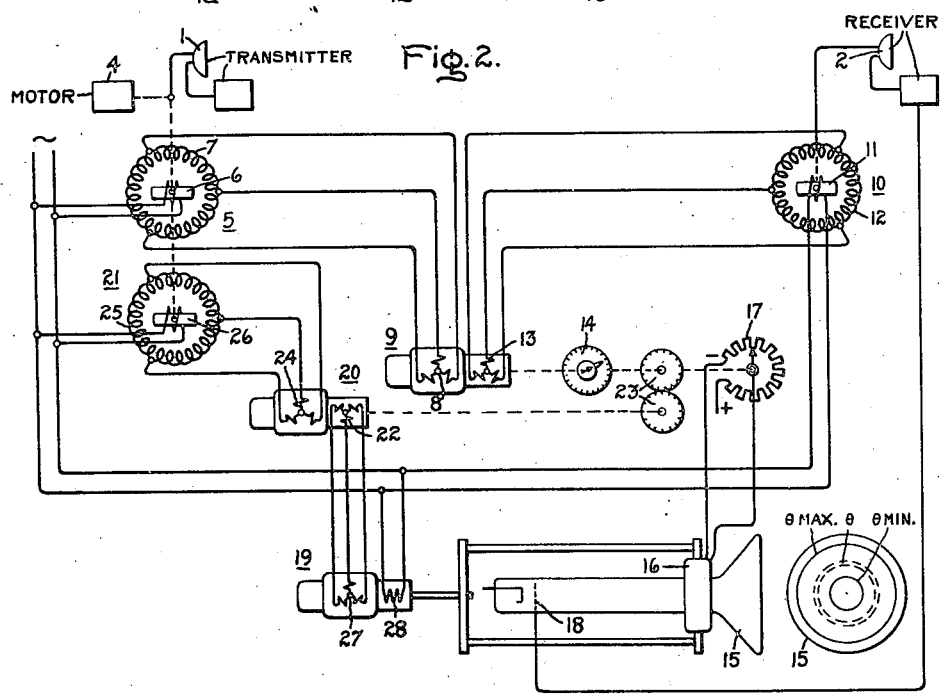

In Fig. 2 a practical embodiment of the locating equipment is diagrammatically shown. The transmitter 1 is driven at a constant speed by a motor 4 and is arranged to radiate supersonic waves continuously. The transmitter is connected to the receiver through a Selsyn 5 having a rotor 6 mechanically connected to rotate with the transmitter and a stator 7 connected to a winding 8 of a differential Selsyn 9. The receiver is associated with a similar Selsyn 10 having a rotor 11 mechanically connected to the receiver so as to rotate with the receiver and having a stator 12 connected to winding 13 of the differential Selsyn. The rotors 6 and 11 are energized from the same A.-C. supply and the voltages induced in the stators 7 and 12 accordingly depend upon the relative positions of the rotors and the relative positions of the windings 8 and 13 of the differential Selsyn. If there were no displacement between the windings 8 and 13 of the differential Selsyn, the voltage in the stator 12 of the receiver Selsyn would be identical with the voltage in the stator 7 of the transmitter Selsyn and the rotor 11 of the receiver Selsyn would assume the same angular position as the rotor 6 of the transmitter Selsyn. This would correspond to the condition of zero angular displacement between the transmitter and receiver. By means of a mechanical connection, indicated as the dial 14, the winding 13 of the differential Selsyn can be angularly displaced from the winding 8, causing a corresponding angular displacement of the voltage in the stator 12 of the receiver Selsyn. The reaction of this voltage on the rotor 11 causes an angular displacement of the receiver relative to the transmitter corresponding to the setting of the dial 14. Since in this particular equipment the angular velocity of the transmitter and the velocity of the wave energy radiated by the transmitter are fixed, the setting of the dial 14 provides a measurement of the range of remote objects.

The range is presented on the viewing screen of a cathode ray tube 15 by means of a deflecting coil 16 surrounding the throat of the cathode ray tube and energized from a potentiometer 17 positioned in accordance with the setting of the dial 14. The coil 16 is arranged to cause a radial deflection of the beam of the cathode ray tube through a distance proportional to the setting of the potentiometer 17. The echo from the remote object, picked up by the receiver, is applied to the grid 18 of the cathode ray tube to modulate the beam and produce a bright spot at a radial distance from the center of the viewing screen proportional to the range of the remote object.

In order that the bright spot on the viewing screen of the cathode ray tube may be angularly positioned in accordance with the direction of the remote object, the deflection coil 16 is rotated by means of a Selsyn 19 connected through a differential Selsyn 20 to a Selsyn 21 connected to the transmitter. The differential Selsyn 20 has a winding 22 connected by a 1:1 gearing 23 to the dial 14. The differential Selsyn has a winding 24 connected to the stator 25 of the Selsyn 21. Since the rotor 26 of the Selsyn 21 is mechanically connected to the transmitter, the voltage induced in the stator 21 varies with the angular direction of the transmitter. This voltage, after passing through the differential Selsyn 20, is displaced through an additional angle equal to the displacement angle between the transmitter and receiver, and, when applied to the stator 27 of the Selsyn 19, causes the rotor 28 (and the coil 16) to assume a position corresponding to the direction of the remote object. If the setting of the dial 14 is fixed, the equipment measures the range and direction of remote objects lying within an annulus having a radial width determined by the directional characteristics of the receiver. By varying the setting of the dial 14 of the equipment, the diameter of the annulus is varied so the equipment in effect can scan a larger annulus. In the drawing the annulus corresponding to the instantaneous angle θ is indicated intermediate the ranges corresponding to the minimum and maximum values of this angle. Because range and direction appear in true relation to the locating equipment, the viewing screen contains a map-like presentation in which the locating equipment is represented at the center of the screen.

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States is:

1. In locating equipment, a directional transmitter, a directional receiver for echoes from remote objects, means for varying the directions of the transmitter and receiver in following relation and at the same average speed with the receiver lagging behind the transmitter at such an angle as to position said receiver to receive any reflected echoes from objects within predetermined range zones, and means utilizing the angle of lag between the transmitter and receiver to determine the range of remote objects within said zones.

2. In locating equipment, a directional transmitter, means for rotating the transmitter to cause the transmission of wave energy throughout a sector, a directional receiver rotatable with the transmitter in following relation and at the same average speed for receiving echoes from ranges determined by the angle the receiver lags the transmitter, means responsive to said angle for indicating the range, and means for varying the angle of lag of the receiver whereby the receiver scans the sector in range and direction.

3. In locating equipment, means including a movable transmitter for transmitting wave energy in a plurality of directions, a directional receiver movable in following relation to and at the same average speed as said transmitter to scan said directions for echoes of the transmitted wave energy, and means utilizing the directive angle of the receiver relative to the transmitting means for indicating the range of remote objects from which echoes are received.

4. In locating equipment, means for transmitting wave energy in a plurality of directions throughout a sector, a receiver movable in the same direction and at the same average speed as said transmitter but lagging behind said transmitter, said receiver having a directional response characteristic narrower than said sector, means for varying the angle of lag and hence the direction of maximum response of the receiver to scan said sector for echoes from remote objects, and coordinating means utilizing the time of transmission of said wave energy from which echoes are received and the instantaneous angle of lag of the receiver to determine the ranges and directions of objects from which echoes are received.

5. In locating equipment, a directional transmitter, a directional receiver for echoes from remote objects, said transmitter and receiver being adjusted to operate on the same frequency, means for varying the directions of the transmitter and receiver at the same average speed with the receiver lagging behind the transmitter, and means utilizing the angle of lag between the transmitter and receiver to determine the range of remote objects.

6. In locating equipment, a directional transmitter, means for rotating the transmitter to cause the transmission of wave energy throughout a sector, a directional receiver rotatable with and at the same average speed as the transmitter for receiving echoes from ranges determined by the angle the receiver lags the transmitter, means responsive to said angle for indicating the range, said transmitter and receiver being adjusted to operate on the same frequency, and means for varying the angle of lag of the receiver whereby the receiver scans the sector in range and direction.

7. In locating equipment, means for transmitting wave energy in a plurality of directions by rotating the transmitting means at a constant speed, a directional receiver movable to scan said directions for echoes of the transmitted wave energy, said receiver lagging behind and rotating at the same average speed as the transmitter means, and means utilizing the directive angle of the receiver relative to the transmitting means for indicating the range of remote objects from which echoes are received.

STANFORD GOLDMAN.